United States Patent Office 3,275,621
Patented Sept. 27, 1966

3,275,621
19-AMINO-Δ⁴-PREGNENES AND -10α-PREGNENES AND PROCESS FOR THEIR PREPARATION
Albert Bowers, Mexico City, Mexico, assignor to Syntex Corporation, Panama, Panama, a corporation of Panama
No Drawing. Filed Dec. 18, 1963, Ser. No. 331,362
38 Claims. (Cl. 260—239.55)

The present application is a continuation-in-part of my U.S. patent applications Serial Nos. 262,240, filed March 1, 1963, and 282,870, filed May 24, 1963, both now abandoned.

The present invention relates to novel cyclopentano-phenanthrene derivatives and to a process for the production thereof.

More particularly, the present invention relates to novel 19-amino-Δ⁴-pregnene compounds, and to the corresponding 10α-derivatives thereof.

The novel compounds of the present invention are represented by the following formulae:

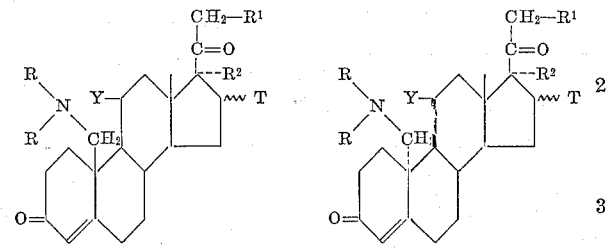

In the above formula either or both R's represent hydrogen or lower alkyl, e.g. methyl, ethyl, propyl, and the like; $R^1$ and $R^2$ each represent hydrogen, hydroxyl or a hydrocarbon carboxylic acyloxy group of less than 12 carbon atoms; T may be hydrogen, α- or β-methyl, α-hydroxyl or α-acyloxy containing less than 12 carbon atoms, and $R^2$ and T together represent the group

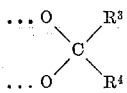

at the 16α,17α-position, wherein $R^3$ and $R^4$ each represent hydrogen or a lower hydrocarbon residue of up to 8 carbon atoms, which may be saturated or unsaturated, of straight, branched, cyclic or cyclic-aliphatic chain, aromatic, or aromatic-aliphatic. Included among such lower hydrocarbon residues are lower alkyl, for example methyl, ethyl, or isopropyl; aralkyl, e.g., benzyl; aryl, for example phenyl or toluyl, and cycloalkyl residues, e.g., cyclohexyl, and the like, Y may be hydrogen or β-hydroxyl; where $R^1$ is not hydrogen, $R^2$ represents hydroxyl, and where $R^1$ is hydrogen, Y is also hydrogen.

The acyloxy groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulae where $R^1$ represents hydrogen are powerful progestational agents with oral activity. In addition they have anti-androgenic, anti-gonadotrophic and anti-estrogenic properties and are very useful in fertility control. Furthermore, they may be used in the treatment of premenstrual tension and exhibit blood chlosterol-lowering and diuretic activities. When applied topically, these compounds are useful in the treatment of acne.

The compounds represented by the above formulae where $R^1$ is not hydrogen and Y represents β-hydroxyl are valuable cortical hormones with anti-inflammatory, low catabolic, glycogenic and thymolytic activities. In addition, they are anti-androgenic, anti-gonadotrophic and anti-estrogenic hormones. Furthermore, they have topical activity in skin disorders such as psoriasis, allergic dermatitis and the like.

The novel compounds of the present invention are prepared by the process exemplified as follows:

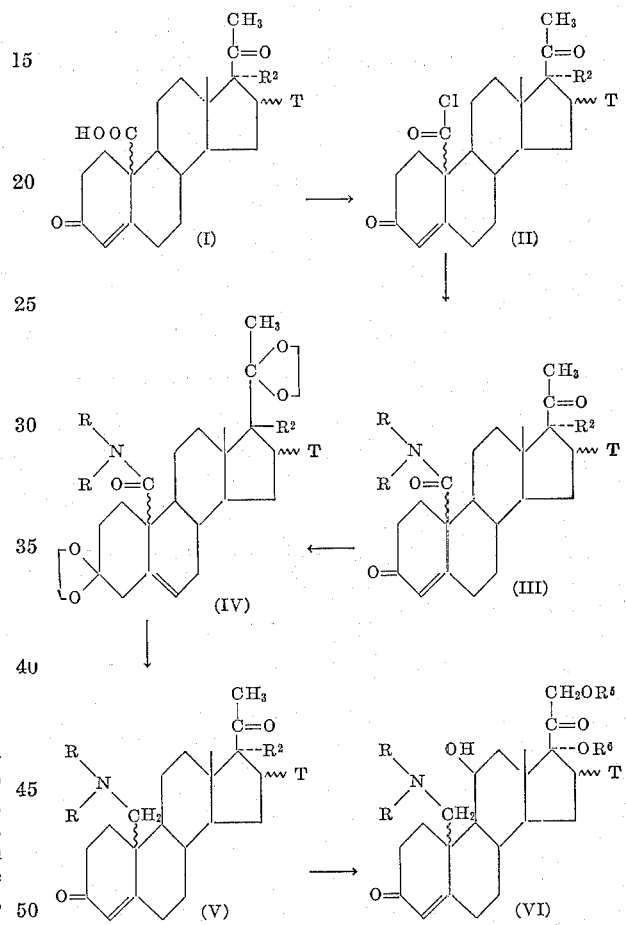

In the above formulae R, $R^2$ and T have the same meaning as set forth hereinbefore; $R^5$ represents hydrogen or a hydrocarbon carboxylic acyl group of less than 12 carbon atoms; $R^6$ represents hydrogen, and $OR^6$ and T together represent the group

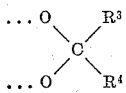

at the 16α,17α-position, wherein $R^3$ and $R^4$ have the same meaning as set forth hereinbefore; ⁀ indicates that C-19 may have the α or β configurations.

In practicing the process outlined above, the starting compound (I) which is a Δ⁴-pregnen-3,20-dione-19-oic acid or a 10α-derivative thereof is treated with oxalyl chloride at reflux temperature for approximately 2 hours to give the corresponding Δ⁴-pregnene-3,20-dione-19-oic acyl chloride (II) which, upon treatment with ammonia or a di-(lower alkyl)-amine, such as dimethyl amine, yields the corresponding amide (III). Protection of the keto groups present in the latter amide by treatment with ethylene glycol in the presence of p-toluenesulfonic acid yields the corresponding amide of 3,20-bis-cycloethylenedioxy-$\Delta^5$-pregnen-19-oic acid (IV). Reduction of the latter amide with lithium aluminum hydride in a suitable solvent, such as tetrahydrofuran, followed by conventional hydrolysis of the ketal groups yields the corresponding 19 - amino-$\Delta^4$-pregnene-3,20 - dione compound (V).

A 10$\beta$ or 10$\alpha$-19-amino-$\Delta^4$-pregnene-3,20-dione derivative having a 17$\alpha$-hydroxyl group or a 16$\alpha$,17$\alpha$-ketonide grouping (V: $R^2$=H) is treated with iodine in the presence of calcium oxide to give the corresponding 21-iodo derivative which, upon reaction with potassium acetate in a suitable solvent, such as acetone, under anhydrous conditions, yields the corresponding 19-amino-$\Delta^4$-pregnen-21-ol-3,20-dione acetate. The latter compound, upon incubation with a suitable microorganism, such as *Curvularia lunata*, in a manner known to those skilled in the art, i.e., in a medium convenient for the life and reproduction of the chosen microorganism, for example a solution containing glucose, di(ammonium)phosphate, di-potassium phosphate, magnesium sulfate, potassium chloride, zinc sulfate, ferrous sulfate and water, for a period of time of the order of 48 hours, yields the corresponding 19-amino-$\Delta^4$-pregnene-11$\beta$,21-diol-3,20-dione (VI).

The compounds of the present invention having a primary hydroxyl group, for example at C–21, are conventionally acylated in the presence of hydrogen chloride with approximately 1 molar equivalent of a hydrocarbon carboxylic acid of the type described hereinbefore, thus affording the corresponding acylates.

The compounds of the present invention having in the molecule a tertiary hydroxyl group and a tertiary amino group are conventionally esterified in the presence of p-toluenesulfonic acid with an acylating agent such as acetic anhydride, caproic anhydride, cyclopentylpropionic anhydride, enanthic anhydride, and the like, to produce the corresponding esters.

The following specific examples serve to illustrate, but are not intended to limit the scope of the present invention.

PREPARATION 1

A solution of 1 g. of 19-hydroxy-progesterone in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed, with water and dried under vacuum, thus affffording a crude product which upon recrystallization from acetone-hexane gave $\Delta^4$-pregnene-3,20-dione-19-oic acid.

The starting compounds listed hereinafter under A (obtained according to my copending U.S. Patent application Ser. No. 201,802, filed June 12, 1962, now U.S. Patent No. 3,145,202, from the corresponding $\Delta^5$-3$\beta$,19-diol compounds by treatment under Oppenauer conditions for approximately 15 minutes) were treated by the above procedure, thus affording respectively the products set forth under B.

| A | B |
|---|---|
| 16$\alpha$-methyl-$\Delta^4$-pregnen-19-ol-3,20-dione. | 16$\alpha$-methyl-$\Delta^4$-pregnene-3,20-dione-19-oic acid. |
| 16$\beta$-methyl-$\Delta^4$-pregnen-19-ol-3,20-dione. | 16$\beta$-methyl-$\Delta^4$-pregnene-3,20-dione-19-oic acid. |
| 16$\alpha$,17$\alpha$-isopropylidenedioxy-$\Delta^4$-pregnen-19-ol-3,20-dione. | 16$\alpha$,17$\alpha$-isopropylidenedioxy-$\Delta^4$-pregnene-3,20-dione 19-oic acid. |
| 17-acetate of 16$\alpha$-methyl-$\Delta^4$-pregnene-17$\alpha$,19-diol-3,20-dione. | 17-acetate of the 16$\alpha$-methyl-$\Delta^4$-pregnen-17$\alpha$-ol-3,20-dione 19-oic acid. |
| 17-acetate of $\Delta^4$-pregnene-17$\alpha$,19-diol-3,20-dione. | 17-acetate of the $\Delta^4$-pregnen-17$\alpha$-ol-3,20-dione 19-oic acid. |

The latter two acetates, set forth under B, were saponified by conventional procedures, thus affording respectively: 16$\alpha$ - methyl-$\Delta^4$-pregnen-17$\alpha$-ol-3,20-dione-19-oic acid and $\Delta^4$-pregnen-17$\alpha$-ol-3,20-dione-19-oic acid.

Example I

A mixture of 1 g. of $\Delta^4$10$\alpha$-pregnene-3,20-dione 19-oic acid, (obtained according to Cross U.S. patent application Serial No. 250,480, filed January 10, 1963, now U.S. Patent No. 3,210,385, from the corresponding 1,3-diketo-2,19-cyclo compounds by treatment with a strong base e.g. sodium hydroxide in water, followed by conventional introduction of a $\Delta^4$-double bond into the resulting 10$\alpha$-steroid-3-one-19-oic acid, for example by treatment with 2 moles of bromine, in the presence of hydrogen bromide, and subsequently first with sodium iodide and second with cromous chloride) and 5 cc. of oxalyl chloride was refluxed under anhydrous conditions during 2 hours. The solution was evaporated in vacuum, 2 portions of dry benzene were added and reevaporated to eliminate traces of oxalyl chloride, thus affording $\Delta^4$-10$\alpha$-pregnene-3,20-dione-19-oic acyl chloride (Cpd. No. 1).

The starting compounds listed hereinafter under A, obtained according to the aforesaid patent application, were treated by the above procedure, thus affording the corresponding products set forth below, under B:

| A | Cpd. No. | B |
|---|---|---|
| 16$\alpha$-methyl-$\Delta^4$-10$\alpha$-pregnene-3,20-dione-19-oic acid. | 2 | 16$\alpha$methyl-$\Delta^4$-10$\alpha$-pregnene-3,20-dione-19-oic acyl chloride. |
| 16$\beta$-methyl-$\Delta^4$-10$\alpha$pregnene-3,20-dione-19-oic acid. | 3 | 16$\beta$-methyl-$\Delta^4$-10$\alpha$-pregnene-3,20-dione-19-oic acyl chloride. |
| 16$\alpha$-17$\alpha$-isopropylidenedioxy-$\Delta^4$-10$\alpha$-pregnene-3,20-dione-19-oic acid. | 4 | 16$\alpha$,17$\alpha$-isopropylidenedioxy-$\Delta^4$-10$\alpha$-pregnene-3,20-dione-19-oic acyl chloride. |
| 17$\alpha$-hydroxy-$\Delta^4$-10$\alpha$-pregnene-3,20-dione 19-oic acid. | 5 | 17$\alpha$-hydroxy-$\Delta^4$-10$\alpha$-pregnene-3,20-dione 19-oic acyl chloride. |
| 16$\alpha$-methyl-17$\alpha$hydroxy-$\Delta^4$-10$\alpha$-pregnene-3,20-dione 19-oic acid. | 6 | 16$\alpha$-methyl-17$\alpha$-hydroxy-$\Delta^4$-10$\alpha$-pregnene-3,20-dione 19-oic acyl chloride. |

Example II 1 g. of compound No. 1 in 50 cc. of dry ether, was added portionwise to 25 cc. of liquid ammonia, and the solvent and excess ammonia was permitted to evaporate overnight. Crystallization of the residue from methanol water furnished the amide of the $\Delta^4$-10$\alpha$-pregnene-3,20-dione-19-oic acid (Cpd. No. 7).

The compounds Nos. 2 to 6, inclusive, were treated by the above procedure thus yielding respectively.

Cpd. No.:
  8. The amide of 16$\alpha$-methyl-$\Delta^4$-10$\alpha$-pregnene-3,20-dione 19-oic acid,
  9. The amide of 16$\beta$-methyl-$\Delta^4$-10$\alpha$-pregnene-3,20-dione 19-oic acid,
  10. The amide of 16$\alpha$,17$\alpha$-isopropylidenedioxy-$\Delta^4$-10$\alpha$-pregnene-3,20-dione-19-oic acid,
  11. The amide of 17$\alpha$h-ydroxy-$\Delta^4$-10$\alpha$-pregnene-3,20-dione-19-ioc acid,
  12. The amide of 16$\alpha$-methyl-17$\alpha$-hydroxy$\Delta^4$-10$\alpha$-pregnene-3,20-dione 19-oic acid.

Example III 1 g. of compound No. 1 was treated with 2 cc. of diethylamine in 50 cc. of benzene. The reaction mixture was left overnight at room temperature, then an aqueous solution of sodium carbonate was added. The resulting mixture was extracted with ether, the extract dried over sodium sulfate and evaporated to dryness. Crystallization from methanol water afforded the N,N-dimethyl amide of $\Delta^4$-10$\alpha$-pregnene-3,20-dione-19-oic acid (Cpd. No. 13).

The compounds Nos. 2 to 6, inclusive, were treated by the above procedure thus yielding respectively.

Cpd. No.:
14. The N,N-dimethylamide of 16α-methyl-Δ⁴-10α-pregnene-3,20-dione 19-oic acid,
15. The N,N-dimethylamide of 16β-methyl-Δ⁴-10α-pregnene-3,20-dione 19-oic acid,
16. The N,N-dimethylamide of 16α,17α-isopropylidenedioxy-Δ⁴-10α-pregnene-3,20-dione 19-oic acid,
17. The N,N-dimethylamide of 17α-hydroxy-Δ⁴-10α-pregnene-3.20-dione 19-oic acid,
18. The N,N-dimethylamide of 16α-methyl-17α-hydroxy-Δ⁴-10α-pregnene-3,20-dione 19-oic acid.

Example IV

A mixture of 5 g. of compound No. 7, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate an devaporated to dryness. The residue crystallized from acetone-hexane to give the amide of 3,20-bis-cycloethylenedioxy, Δ⁵-10α-pregnen-19-oic acid (Cpd. No. 19).

A solution of 1 g. of compound No. 19, in 50 cc. of tetrahydrofuran was added over a 30 minutes period to stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 3,20-bis-cycloethylenedioxy-19-amino-Δ⁵-10α-pregnene (Cpd. No. 20).

A solution of 500 mg. of compound No. 20 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-amino-Δ⁴-10α-pregnene-3,20-dione (Cpd. No. 21).

The compounds Nos. 8 to 18, inclusive, were treated following the same procedures, thus affording firstly the corresponding 3,20-bis-cycloethylenedioxy-Δ⁵-derivatives, secondly the corresponding 19-amines of the latter derivatives and finally Cpd. No.:
22. 19 - amino-16α-methyl-Δ⁴-10α-pregnene-3,20-dione,
23. 19 - amino - 16β-methyl-Δ⁴-10α-pregnene-3,20-dione,
24. 19 - amino-16α,17α-isopropylidenedioxy-Δ⁴-10α-pregnene-3,20-dione,
25. 19 - amino - 17α-hydroxy-Δ⁴-10α-pregnene-3,20-dione,
26. 19 - amino - 16α - methyl-17α-hydroxy-Δ⁴-10α-pregnene-3,20-dione,
27. 19 - (N,N-dimethylamino)-Δ⁴-10α-pregnene-3,20-dione,
28. 19 - (N,N - dimethylamino)-16α-methyl-Δ⁴-10α-pregnene-3,20-dione,
29. 19 - (N,N - dimethylamino)-16β-methyl-Δ⁴-10α-pregnene-3,20-dione,
30. 19 - (N,N - dimethylamino)-16α,17α-isopropylidenedioxy-Δ⁴-10α-pregnene-3,20-dione,
31. 19 - (N,N-dimethylamino)-17α-hydroxy-Δ⁴-10α-pregnene-3,20-dione,
32. 19 - (N,N-dimethylamino)-16α-methyl-17α-hydroxy-Δ⁴-10α-pregnene-3,20-dione, respectively.

Example V

A cooled solution of 4 g. of compound No. 24 in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo derivative of compound No. 24. This derivative was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 19-amino-16α,17α-isopropylidenedioxy-Δ⁴-10α-pregnen-ol-3,21-dione acetate (Cpd. No. 33).

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | G. |
|---|---|
| Glucose | 20 |
| $(NH_4)_2HPO_4$ | 5 |
| or | |
| $NaNO_3$ | 3 |
| $K_2HPO_4$ | 1 |
| $MgSO_4 \cdot 7H_2O$ | 0.2 |
| KCl | 0.5 |
| $ZnSO_4$ | Traces |
| $FeSO_4 \cdot 7H_2O$ | Traces |
| Distilled water to complete 1 lt. | |

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask, there was added 0.5 cc. of a solution of 0.5 g. of compound No. 33 in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was chromatographed on 4 g. of silica gel, thus producing 19-amino-16α,17α - isopropylidenedioxy - Δ⁴-10α-pregnene-11β,21-diol-3,20-dione (Cpd. No. 34).

The compounds Nos. 25, 26, 30, 31 and 32 were treated in accordance with the above procedures, thus furnishing firstly the corresponding 21-iodo derivatives, secondly the corresponding 21-acetoxy derivatives and finally Cpd. No.:
35. 19 - amino - Δ⁴-10α-pregnene-11β,17α,21-triol-3,20-dione,
36. 19 -amino - 16α-methyl-Δ⁴-10α-pregnene-11β,17α,21-triol-3,20-dione,
37. 19 - (N,N,-dimethylamino)-16α,17α-isopropylidenedioxy - Δ⁴ - 10α - pregnene-11β,21-diol-3,20-dione, 38. 19 - (N,N-dimethylamino)-Δ⁴-10α-pregnene-11β, 17α,21-triol-3,20-dione, 39. 19 - (N,N - dimethylamino)-16α-methyl-Δ⁴-10α-pregnene-11β,17α,21-triol-3,20-dione.

*Example VI*

Through a solution of 1 g. of compound No. 34 in 20 cc. of dioxane and 1.1 molar equivalents of acetic acid, was passed a slow current of hydrogen chloride for 3 hours. The reaction mixture was then poured into 100 cc. of water, and washed with methylene chloride. The aqueous layer was alkalized with a 5% aqueous sodium hydroxide solution and extracted with ethyl acetate. The organic layer was washed with water, dried, and evaporated to dryness. The residue crystallized from acetone-benzene, thus furnishing 19-amino-16α,17α-isopropylidenedioxy-Δ⁴-10α-pregnene-11β,21-diol-3,20-dione 21-acetate (Cpd. No. 40).

The compounds Nos. 35 to 39, inclusive, were treated according to the above procedure thus yielding respectively Cpd. No.:
41. 19 - amino-Δ⁴-10α-pregnene-11β,17α,21-triol-3,20-dione 21 acetate,
42. 19 - amino-16α-methyl-Δ⁴10α-pregnene-11β,17α,21-triol-3,20-dione 21-acetate,
43. 19 - (N,N - dimethylamino)-16α,17α-isopropylidenedioxy - Δ⁴ - 10α-pregnene-11β,21-diol-3,20-dione 21-acetate,
44. 19 - (N,N-dimethylamino)-Δ⁴-10α-pregnene-11β, 17α,21-triol-3,20-dione 21-acetate,
45. 19 - (N,N-dimethylamino)-16α-methyl-Δ⁴-10α-pregnene-11β,17α,21-triol-3,20-dione 21-acetate.

*Example VII*

When treating the starting compounds indicated in Example VI with propionic acid and caproic acid instead of acetic acid, there were obtained, respectively, the corresponding 21-propionates and 21-caproates.

*Example VIII*

To a solution of 5 g. of compound No. 31 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19 - (N,N-dimethylamino)-17α-hydroxy-Δ⁴10α-pregnene-3,20-dione 17-caproate (Cpd. No. 46).

The compound No. 32 was treated by the same procedure, thus yielding 19-(N,N-dimethylamino)-16α-methyl-17α - hydroxy - Δ⁴-10α-pregnene-3,20-dione 17-caproate (Cpd. No. 47).

*Example IX*

The starting compounds of Example VIII were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates and cyclopentylpropionates of said starting compounds.

*Example X*

1 g. of compound No. 24 was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 19-amino-Δ⁴-10α-pregnene-16α,17α-diol-3,20-dione (Cpd. No. 48).

Following the same procedure, there were treated the compounds Nos. 30, 34 and 37, thus yielding respectively Cpd. No.:
49. 19 - (N,N-dimethylamino)-Δ⁴-10α-pregnene-16α,17α-diol-3,20-dione,
50. 19-amino-Δ⁴-10α-pregnene-11β,16α,17α,21-tetrol-3,20-dione,
51. 19 - (N,N-dimethylamino)-Δ⁴-10α-pregnene-11β, 16α,17α,21-tetrol-3,20-dione.

*Example XI*

The compounds Nos. 48 to 51, inclusive, were treated according to Example VI, except that propionic acid was used instead of acetic acid, thus yielding respectively Cpd No.:
52. 19 - amino-Δ⁴-10α-pregnene-16α,17α-diol-3,20-dione 16-propionate,
53. 19 - (N,N-dimethylamino)-Δ⁴-10α-pregnene-16α, 17α-diol-3,20-dione 16-propionate,
54. 19-amino-Δ⁴-10α-pregnene-11β,16α,17α,21-tetrol-3,20-dione 16,21-dipropionate,
55. 19 - (N,N-dimethylamino)-Δ⁴-10α-pregnene-11β, 16α,17α,21-tetrol-3,20-dione 16,21-dipropionate.

*Example XII*

A mixture of 1 g. of Δ⁴-pregnene-3,20-dione 19-oic acid and 5 cc. of oxalyl chloride was refluxed under anhydrous conditions during 2 hours. The solution was evaporated in vacuum, 2 portions of dry benzene were added and re-evaporated to eliminate traces of oxalyl chloride, thus affording Δ⁴-pregnene-3,20-dione-19-oic acyl chloride (Cpd. No. 56).

The starting compounds listed hereinafter under A, obtained according to Preparation 1, were treated by the above procedure, thus affording the corresponding products set forth below, under B:

| A | Cpd. No. | B |
|---|---|---|
| 16α-methyl-Δ⁴-pregnene-3,20-dione 19-oic acid. | 57. | 16α-methyl-Δ⁴-pregnene-3,20-dione-19-oic acyl chloride. |
| 16β-methyl-Δ⁴-pregnene-3,20-dione 19-oic acid. | 58. | 16β-methyl-Δ⁴-pregnene-3,20-dione-19-oic acyl chloride. |
| 16α,17α-isopropylidene-dioxy-Δ⁴-pregnene-3,20-dione 19-oic acid. | 59. | 16α,17α-isopropylidene-dioxy-Δ⁴-pregnene-3,20-dione 19-oic acyl chloride. |
| 17α-hydroxy-Δ⁴-pregnene-3,20-dione 19-oic acid. | 60. | 17α-hydroxy-Δ⁴-pregnene 3,20-dione 19-oic acyl chloride |
| 16α-methyl-17α-hydroxy-Δ⁴-pregnene-3,20-dione 19-oic acid. | 61. | 16α-methyl-17α-hydroxy-Δ⁴-pregnene-3,20-dione 19-oic acyl chloride. |

*Example XIII*

1 g. of compound No. 56 in 50 cc. of dry ether, was added portionwise to 25 cc. of liquid ammonia, and the solvent and excess ammonia was perimtted to evaporate overnight. Crystallization of the residue from methanol water furnished the amide of the Δ⁴-pregnene-3,20-dione 19-oic acid (Cpd. No. 62).

The compounds Nos. 57 to 61, inclusive, were treated by the above procedure thus yielding respectively Cpd. No.:
63. The amide of 16α-methyl-Δ⁴-pregnene-3,20-dione 19-oic acid,
64. The amide of 16β-methyl-Δ⁴-pregnene-3,20-dione 19-oic acid,
65. The amide of 16α,17α-isopropylidenedioxy-Δ⁴-pregnene-3,20-dione 19-oic acid,
66. The amide of 17α-hydroxy-Δ⁴-pregnene-3,20-dione 19-oic acid,
67. The amide of 16α-methyl-17α-hydroxy-Δ⁴-pregnene-3,20-dione 19-oic acid.

Example XIV 1 g. of compound No. 56 was treated with 2 cc. of dimethylamine in 50 cc. of benzene. The reaction mixture was left overnight at room temperature, then an aqueous solution of sodium carbonate was added. The resulting mixture was extracted with ether, the extract dried over sodium sulfate and evaporated to dryness. Crystallization from methanol water afforded the N,N-dimethyl amide of $\Delta^4$-pregnene-3,20-dione 19-oic acid (Cpd. No. 68).

The compounds Nos. 2 to 6, inclusive, were treated by the above procedure thus yielding respectively Cpd. No.:
- 69. The N,N-dimethylamide of 16α-methyl-$\Delta^4$-pregene-3,20-dione 19-oic acid,
- 70. The N,N-dimethylamide of 16β-methyl-$\Delta^4$-pregnene-3,20-dione 19-oic acid,
- 71. The N,N-dimethylamide of 16α,17α-isopropylidenedioxy-$\Delta^4$-pregnene-3,20-dione 19-oic acid,
- 72. The N,N-dimethylamide of 17α-hydroxy-$\Delta^4$-pregnene-3,20-dione 19-oic acid,
- 73. The N,N-dimethylamide of 16α-methyl-17α-hydroxy-$\Delta^4$-pregnene-3,20-dione 19-oic acid.

Example XV

A mixture of 5 g. of compound No. 62, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give the amide of 3,20-biscycloethylenedioxy $\Delta^5$-pregnen-19-oic acid (Cpd. No. 74).

A solution of 1 g. of compound No. 74, in 50 cc. of tetrahydrofuran, was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, and the inorganic material filtered off and thoroughly washed with hot ethyl acetate. The combined organic solutions, upon evaporation, yielded a crude material, which was purified by crystallization from acetone-hexene, thus giving 3,20-bis-cycloethylenedioxy-19-amino-$\Delta^5$-pregnene (Cpd. No. 75).

A solution of 500 mg. of compound No. 75 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexene gave 19-amino-$\Delta^4$-pregnene-3,20 - dione (Cpd. No. 76).

The compounds Nos. 63 to 73, inclusive, were treated following the same procedures, thus affording firstly the corresponding 3,20-bis-cycloethylenedioxy-$\Delta^5$-derivatives, secondly the corresponding 19-amines of the latter derivatives, and finally Cpd. No.:
- 77. 19-amino-16α-methyl-$\Delta^4$-pregnene-3,20-dione,
- 78. 19-amino-16β-methyl-$\Delta^4$-pregnene-3,20-dione,
- 79. 19 - amino-16α,17α-isopropylidenedioxy-$\Delta^4$-pregnene-3,20-dione,
- 80. 19-amino-17α-hydroxy-$\Delta^4$-pregnene-3,20-dione,
- 81. 19 - amino-16α-methyl-17α-hydroxy-$\Delta^4$-pregnene-3,20-dione,
- 82. 19-(N,N-dimethylamino)-$\Delta^4$-pregnene - 3,20-dione,
- 83. 19 - (N,N-dimethylamino)-16α-methyl-$\Delta^4$-pregnene-3,20-dione,
- 84. 19 - (N,N-dimethylamino)-16β-methyl-$\Delta^4$-pregnene-3,20-dione,
- 85. 19 - (N,N-dimethylamino)-16α,17α-isopropylidenedioxy-$\Delta^4$-pregnene-3,20-dione,
- 86. 19 - (N,N-dimethylamino)-17α-hydroxy-$\Delta^4$-pregnene-3,20-dione,
- 87. 19 - (N,N-dimethylamino)-16α-methyl-17α-hydroxy-$\Delta^4$-pregnene-3,20-dione, respectively.

Example XVI

A cooled solution of 4 g. of compound No. 79, in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-diodo derivative of compound No. 79. This derivative was mixed with 80 cc. of acetone and 12 g. of recently fused potassium acetate and the mixture was refluxed for 8 hours, concentrated to a small volume diluted with water and extracted with ethyl acetate; the extract was washed with water, dried over anhydrous sodium sulfate and concentrated until crystallization started. The precipitate was collected and crystallized from methanol water, thus yielding 19-amino-16α,17α-isopropylidenedioxy-$\Delta^4$-pregnene-21 - ol - 3,20-dione acetate (Cpd. No. 88).

A strain of *Curvularia lunata* ATCC 13935 was grown in a Sabourini-glucoso-agar medium (Difco). The growth obtained after incuberating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | G. |
|---|---|
| Glucose | 20 |
| $(NH_4)_2HPO_4$ | 5 |
| or | |
| $NaNO_3$ | 3 |
| $K_2HPO_4$ | 1 |
| $MgSO_4 \cdot 7H_2O$ | 0.2 |
| KCl | 0.5 |
| $ZnSO_4$ | Traces |
| $FeSO_4 \cdot 7H_2O$ | Traces |
| Distilled water to complete 1 lt. | |

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of compound No. 33 in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was chromatographed on 4 g. of silica gel thus producing 19-amino-16α,17α - isopropylidenedioxy - $\Delta^4$ - pregnene - 11β,21-diol-3,20-dione (Cpd. No. 89).

The compounds Nos. 80, 81, 85, 86 and 87 were treated in accordance with the above procedures, thus furnishing firstly the corresponding 21-iodo derivatives, secondly the corresponding 21-acetoxy derivatives and finally Cpd. No.:
90. 19-amino-Δ⁴-pregnene-11β,17α,21-triol-3,20-dione,
91. 19-amino-16α-methyl-Δ⁴-pregnene-11β,17α,21-triol-3,20-dione,
92. 19-(N,N-dimethylamino)-16α,17α-isopropylidenedioxy-Δ⁴-pregnene-11β,21-diol-3,20-dione,
93. 19-(N,N-dimethylamino)-Δ⁴-pregnene-11β,17α,21-triol-3,20-dione,
94. 19-(N,N-dimethylamino)-16α-methyl-Δ⁴-pregnene-11β,17α,21-triol-3,20-dione.

*Example XVII*

Through a solution of 1 g. of compound No. 89 in 20 cc. of dioxane and 1.1 molar equivalents of acetic acid, was passed a slow current of hydrogen chloride for 3 hours. The reaction mixture was then poured into 100 cc. of water, and washed with methylene chloride. The aqueous layer was alkalized with a 5% aqueous sodium hydroxide solution and extracted with ethyl acetate. The organic layer was washed with water, dried, and evaporated to dryness. The residue crystallized from acetone-benzene, thus furnishing 19-amino-16α,17α-isopropylidenedioxy - Δ⁴ - pregnene - 11β,21 - diol - 3,20 - dione 21-acetate (Cpd. No. 95).

The compounds Nos. 90 to 94, inclusive, were treated according to the above procedure thus yielding respectively Cpd. No.:
96. 19-amino-Δ⁴-pregnene-11β,17α,21-triol-3,20-dione 21-acetate,
97. 19-amino-16α-methyl-Δ⁴-pregnene-11β,17α-21-triol-3,20-dione 21-acetate,
98. 19-(N,N-dimethylamino)-16α,17α-isopropylidenedioxy-Δ⁴-pregnene-11β,21-diol-3,20-dione 21-acetate,
99. 19-(N,N-dimethylamino)-Δ⁴-pregnene-11β,17α,21-triol-3,20-dione 21-acetate,
100. 19-(N,N-dimethylamino)-16α-methyl-Δ⁴-pregnene-11β,17α,21-triol-3,20-dione 21-acetate.

*Example XVIII*

When treating the starting compounds indicated in Example XVII with propionic acid and caproic acid instead of acetic acid, there were obtained, respectively, the corresponding 21-propionates and 21-caproates.

*Example XIX*

To a solution of 5 g. of compound No. 86 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-(N,N-dimethylamino)-17α-hydroxy - Δ⁴ - pregnene - 3,20 - dione 17-caproate (Cpd. No. 101).

The compound No. 87 was treated by the same procedure, thus yielding 19-(N,N-dimethylamino)-16α-methyl-17α-hydroxy-Δ⁴-pregnene-3,20-dione 17-caproate (Cpd. No. 102).

*Example XX*

The starting compounds of Example XIX were treated following exactly the procedure described in that example, except that caproic anhydride was substituted by acetic anhydride, propionic anhydride, enanthic anhydride any cyclopentylpropionic anhydride, thus affording respectively the corresponding acetates, propionates, enanthates and cyclopentylpropionates of said starting compounds.

*Example XXI*

1 g. of compound No. 79 was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 19-amino-Δ⁴-pregnene-16α, 17α-diol-3,20-dione (Cpd. No. 103).

Following the same procedure, there were treated the compounds Nos. 85, 89 and 92, thus yielding respectively Cpd. No.:
104. 19-(N,N-dimethylamino)-Δ⁴-pregnene-16α,17α-diol-3,20-dione,
105. 19-amino-Δ⁴-pregnene-11β,16α,17α,21-tetrol-3,20-dione,
106. 19-(N,N-dimethylamino)-Δ⁴-pregnene-11β,16α,17α,21-tetrol-3,20-dione.

*Example XXII*

The compounds Nos. 103 to 106, inclusive, were treated according to Example XVII, except that propionic acid was used instead of acetic acid, thus yielding respectively Cpd. No.:
107. 19 - amino-Δ⁴-pregnene-16α,17α-diol-3,20-dione 16-propionate,
108. 19-(N,N-dimethylamino)-Δ⁴-pregnene-16α,17α-diol-3,20-dione 16-propionate,
109. 19-amino-Δ⁴-pregnene-11β,16α,17α,21-tetrol-3,20-dione 16,21-dipropionate,
110. 19-(N,N-dimethylamino)-Δ⁴-pregnene-11β,16α,17α-21-tetrol-3,20-dione 16,21-dipropionate.

I claim:
1. A compound of the following formula:

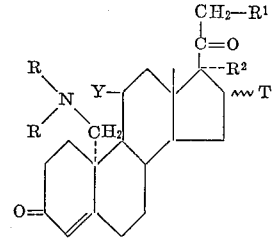

wherein R is selected from the group consisting of hydrogen and lower alkyl; $R^1$ and $R^2$ are members of the group consisting of hydrogen, hydroxyl and a hydrocarbon carboxylic acyloxy group of less than 12 carbon atoms and $R^2$ is hydroxyl when $R^1$ is other than hydrogen; T is selected from the group consisting of hydrogen, α-methyl, β-methyl, α-hydroxyl and α-hydrocarbon carboxylic acyloxy of less than 12 carbon atoms; $R^2$ and T together form the group

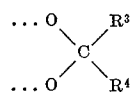

at the 16α, 17α-positions, wherein $R^3$ and $R^4$ each is a lower hydrocarbon residue of up to 8 carbon atoms; Y is a member of the group consisting of hydrogen and β-hydroxyl and where $R^1$ is hydrogen, Y is hydrogen.

2. 19-amino-Δ⁴-10α-pregnene-3,20-dione.
3. 19-amino-16α-methyl-Δ⁴-10α-pregnene-3,20-dione.
4. 19-amino-16β-methyl-Δ⁴-10α-pregnene-3,20-dione.
5. 19-amino-16α,17α-isopropylidenedioxy - Δ⁴ - 10α-pregnene-3,20-dione.
6. 19-amino-17α-hydroxy-Δ⁴-10α-pregnene-3,20 - dione.
7. 19-amino-16α-methyl-17α-hydroxy - Δ⁴ - 10α - pregnene-3,20-dione.
8. 19-(N,N-dimethylamino) - Δ⁴ - 10α-pregnene-3,20-dione.
9. 19 - (N,N-dimethylamino)-16α-methyl-Δ⁴-10α-pregnene-3,20-dione.

10. 19-(N,N-dimethylamino)-16β-methyl - Δ⁴ - 10α-pregnene-3,20-dione.

11. 19 - (N,N-dimethylamino)-16α,17α-isopropylidenedioxy-Δ⁴-10α-pregnene-3,20-dione.

12. 19-(N,N-dimethylamino)-17α-hydroxy - Δ⁴ - 10α-pregnene-3,20-dione.

13. 19-(N,N-dimethylamino)-16α-methyl-17α-hydroxy-Δ⁴-10α-pregnene-3,20-dione.

14. 19-amino-16α,17α-isopropylidenedioxy - Δ⁴ - 10α-pregnene-11β,21-diol-3,20-dione.

15. 19 - amino-Δ⁴-10α-pregnene-11β,17α,21-triol-3,20-dione.

16. 19-amino-16α-methyl-Δ⁴-10α - pregnene - 11β,17α,21-triol-3,20-dione.

17. 19 - (N,N-dimethylamino)-16α,17α-isopropylidenedioxy-Δ⁴-10α-pregnene-11β,21-diol-3,20-dione.

18. 19-(N,N-dimethylamino) - Δ⁴ - 10α-pregnene-11β,17α,21-triol-3,20-dione.

19. 19-(N,N-dimethylamino)-16α-methyl - Δ⁴ - 10α-pregnene-11β-17α,21-triol-3,20-dione.

20. A compound of the following formula:

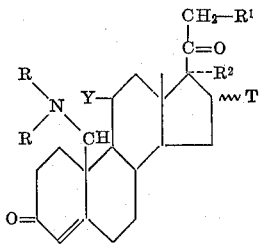

wherein R is selected from the group consisting of hydrogen and lower alkyl; R¹ and R² are members of the group consisting of hydrogen, hydroxyl and a hydrocarbon carboxylic acyloxy group of less than 12 carbon atoms and R² is hydroxyl when R¹ is other than hydrogen; T is selected from the group consisting of hydrogen, α-methyl, β-methyl, α-hydroxyl and α-hydrocarbon carboxylic acyloxy of less than 12 carbon atoms; R² and T together form the group

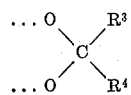

at the 16α,17α-positions, wherein each of R³ and R⁴ is a lower hydrocarbon residue of up to 8 carbon atoms; Y is a member of the group consisting of hydrogen and β-hydroxyl and where R¹ is hydrogen, Y is hydrogen.

21. 19-amino-Δ⁴-pregnene-3,20-dione.

22. 19-amino-16α-methyl-Δ⁴-pregnene-3,20-dione.

23. 19-amino-16β-methyl-Δ⁴-pregnene-3,20-dione.

24. 19-amino-16α,17α-isopropylidenedioxy - Δ⁴ - pregnene-3,20-dione.

25. 19-amino-17α-hydroxy-Δ⁴-pregnene-3,20-dione.

26. 19-amino-16α-methyl-17α-hydroxy - Δ⁴ - pregnene-3,20-dione.

27. 19-(N,N-dimethylamino)-Δ⁴-pregnene-3,20 - dione.

28. 19-(N,N-dimethylamino)-16α-methyl - Δ⁴ - pregnene-3,20-dione.

29. 19-(N,N-dimethylamino)-16β-methyl - Δ⁴ - pregnene-3,20-dione.

30. 19 - (N,N-dimethylamino)-16α,17α-isopropylidenedioxy-Δ⁴-pregnene-3,20-dione.

31. 19-(N,N-dimethylamino)-17α-hydroxy - Δ⁴ - pregnene-3,20-dione.

32. 19-(N,N-dimethylamino)-16α-methyl-17α-hydroxy-Δ⁴-pregnene-3,20-dione.

33. 19-amino-16α,17α-isopropylidenedioxy - Δ⁴ - pregnene-11β,21-diol-3,20-dione.

34. 19 - amino - Δ⁴ - pregnene - 11β,17α,21 - triol-3,20-dione.

35. 19-amino-16α-methyl - Δ⁴ - pregnene-11β,17α,21-triol-3,20-dione.

36. 19 - (N,N-dimethylamino)-16α,17α-isopropylidenedioxy-Δ⁴-pregnene-11β,21-diol-3,20-dione.

37. 19-(N,N-dimethylamino)-Δ⁴-pregnene - 11β,17α,21-triol-3,20-dione.

38. 19-(N,N-dimethylamino)-16α-methyl - Δ⁴ - pregnene-11β,17α,21-triol-3,20-dione.

No references cited.

LEWIS GOTTS, *Primary Examiner.*

THOMAS M. MESHBESHER, *Assistant Examiner.*